United States Patent [19]

Strick

[11] Patent Number: 4,475,740

[45] Date of Patent: Oct. 9, 1984

[54] ARTICULATED TRUCK/TRAILER COMBINATION

[76] Inventor: Leonard Strick, 2401 Pennsylvania Ave., Philadelphia, Pa. 19130

[21] Appl. No.: 258,149

[22] Filed: Apr. 27, 1981

[51] Int. Cl.³ ............................................... B60D 1/14
[52] U.S. Cl. ................................ 280/403; 280/438 R; 280/493
[58] Field of Search ........... 280/403, 404, 408, 423 R, 280/426, 433, 438 R, 493; D12/93, 96, 97, 101, 102

[56] References Cited

U.S. PATENT DOCUMENTS

| | | | |
|---|---|---|---|
| 3,105,703 | 10/1963 | Rittenhouse | 280/423 R |
| 3,163,306 | 12/1964 | Bennett et al. | 280/423 R |
| 3,237,966 | 3/1966 | Ayers | 280/408 |
| 3,401,955 | 9/1968 | Alton | 280/404 |
| 3,484,852 | 12/1969 | Norrie et al. | 280/476 |
| 3,841,511 | 10/1974 | Haun | 280/423 R |
| 4,303,258 | 12/1981 | Davis | 280/403 |

Primary Examiner—Joseph F. Peters, Jr.
Assistant Examiner—D. Lynn Fugate
Attorney, Agent, or Firm—Duffield & Lehrer

[57] ABSTRACT

An articulated vehicle for carrying cargo. The vehicle includes a truck in the form of a tractor having a cab mounted on a chassis and supported on small diameter wheels. A first body is releasably, but stationarily, secured to the chassis by an elevatable fifth wheel assembly. A trailer, which is mounted on identical diameter wheels, is connected to the truck body, via a tow bar-pintle hook connection. The connection is located approximately 8 feet (2.44 m) forward of the end of the truck body. The trailer is separated from the truck body by approximately 1 foot (30.5 cm) so that it is enabled to pivot with respect to the truck through a long swing angle to enable the vehicle to safely negotiate corners and curves. The fifth wheel assembly is elevatable to enable the tractor, when the body is removed therefrom, to be used with conventional trailers. Each body includes at least one, externally mounted roll-up door assembly and jacking means for raising the height of the body to that of a conventional loading dock.

15 Claims, 9 Drawing Figures

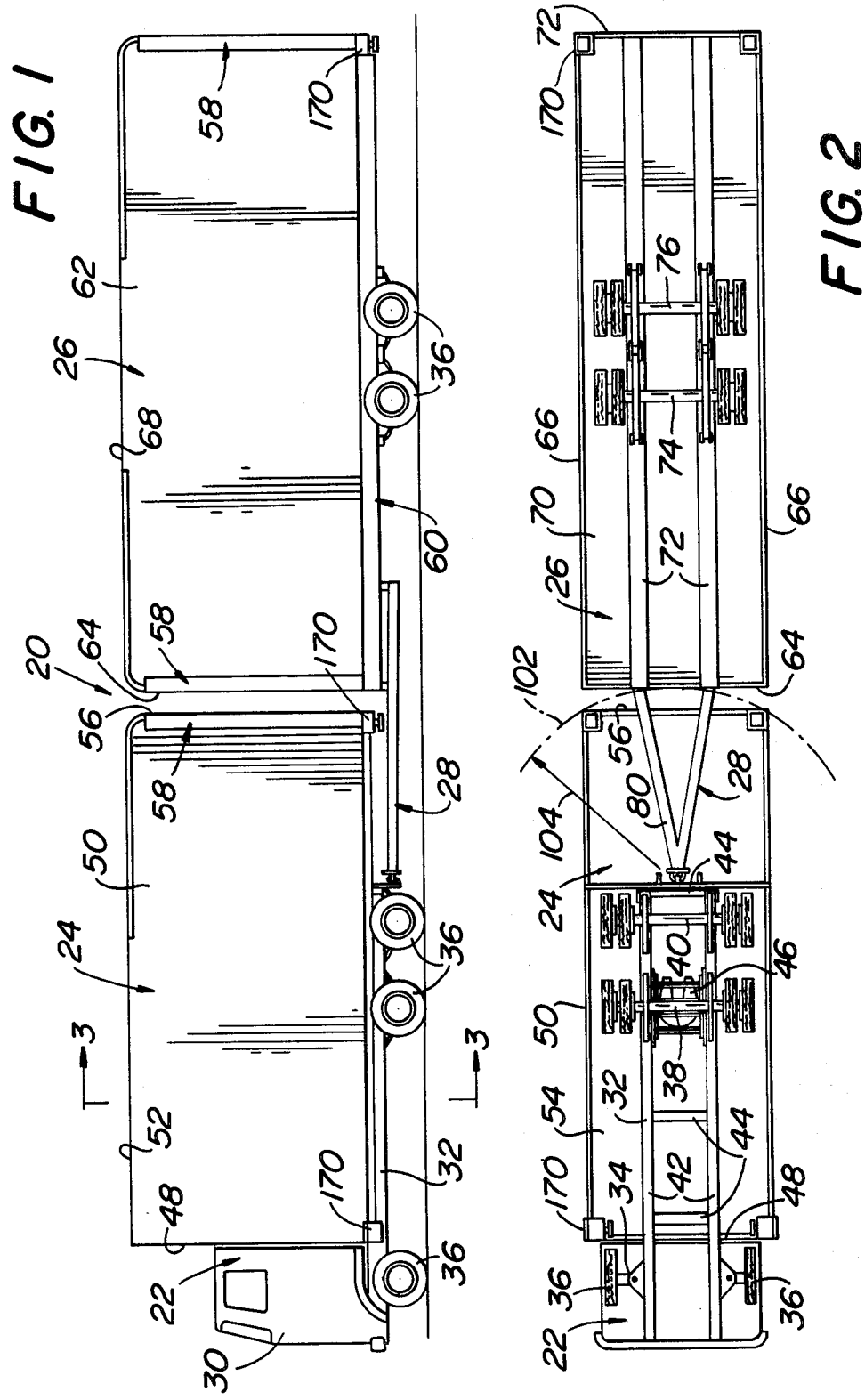

ARTICULATED TRUCK/TRAILER COMBINATION

This invention relates generally to cargo-carrying vehicles, and more particularly to tractor-trailer vehicles.

Various tractor-trailer combinations have been disclosed in the patent literature and are commercially available which utilize at least two cargo-carrying bodies which are pivotably connected to each other. For example, in U.S. Pat. No. 3,237,966, (Ayers), there is shown a combination vehicle including a tractor having a trailer body rigidly secured thereto by a coupling or hitch so that the body is closely adjacent the tractor cab, like in a truck. A trailer body is connected to the truck body by a conventional hitch.

In U.S. Pat. No. 3,484,852 (Norrie et al), there is shown a combination vehicle comprising a tractor on which a trailer body is secured. A second trailer is connected to the body of the first trailer, via a tow bar and an eye.

In U.S. Pat. No. 3,841,511, (Haun), there is shown a combination vehicle comprising a first modular cargo body releasably secured on the frame of a tractor and a second similar body mounted on a pair of wheeled carriage units. The front carriage unit is connected to the frame of the tractor, via drawbar.

While prior art combination vehicles, such as described above, are generally suitable for their intended purposes, they nevertheless suffer from one or more of the following drawbacks: limited cargo-carrying capacity, compatability with existing handling equipment and loading structures, complexity, cost, maneuverability, etc.

Accordingly, it is the general object of the instant invention to provide an articulated vehicle which overcomes the disadvantages of the prior art.

It is the further object of the instant invention to provide an articulated vehicle for maximizing cargo capacity within a given length and for providing full maneuvering ability on a road.

It is a further object of the instant invention to provide an articulated vehicle which includes a tractor suitable for use with conventional trailers or with the cargo-carrying beds or bodies of the instant invention.

It is a further object of the instant invention to provide an articulated vehicle having two bodies which are pivotably connected to each other, with the first body being fixedly mounted on the tractor to form a truck-like assembly.

It is further object of the instant invention to provide an articulated vehicle combination having a pair of cargo-carrying beds, each mounted closer to the ground than conventional trailer bodies.

It is still a further object of the instant invention to provide an articulated combination vehicle comprising a first body mounted on a tractor and to which is pivotably connected, a second body, with the first body including a door at the rear end thereof and with the second body including a door in the front end and a door at the rear end to enable loading both bodies on a single, drive-through plan.

These and other objects of the instant invention are achieved by providing an articulated vehicle comprising a tractor having a cab, a frame including at least one pair of wheels fixedly mounted thereon and a first cargo-carrying bed releasably mounted on said frame and a trailer having a second cargo-carrying bed connected to said first bed by an articulated connection. The first bed has a first end and a second end and the second bed has a first and second end. One of the beds includes first coupling means fixedly mounted thereon between the first and second ends a first predetermined distance from the second end. The other of the beds includes second coupling means fixedly mounted thereon and extending a second predetermined distance beyond the first end for pivotable engagement with the first coupling means to enable the beds to pivot with respect to each other through a large arc having a radius of said second predetermined distance. The second predetermined distance is greater than the first predetermined distance so that the two beds are closely spaced from each other while enabling the beds to pivot with respect to each other sufficiently to negotiate corners and turns.

In the preferred embodiment of the invention, the first coupling means is mounted approximately 8 feet (2.44 m) from the second end of the first bed and the second coupling means comprises a tow bar extending approximately 9 feet (2.75 m) beyond the first end of the second bed so that the second end of the first bed and the first end of the second bed are spaced approximately 1 foot (30.5 cm) from each other.

Other objects and many of the attendant advantages of this invention will be readily appreciated as the same becomes better understood by reference to the following detailed description when considered in connection with the accompanying drawing wherein:

FIG. 1 is a side elevational view of a combination vehicle in accordance with the instant invention;

FIG. 2 is a plan view of the underside of the vehicle shown in FIG. 1;

Figure 3:
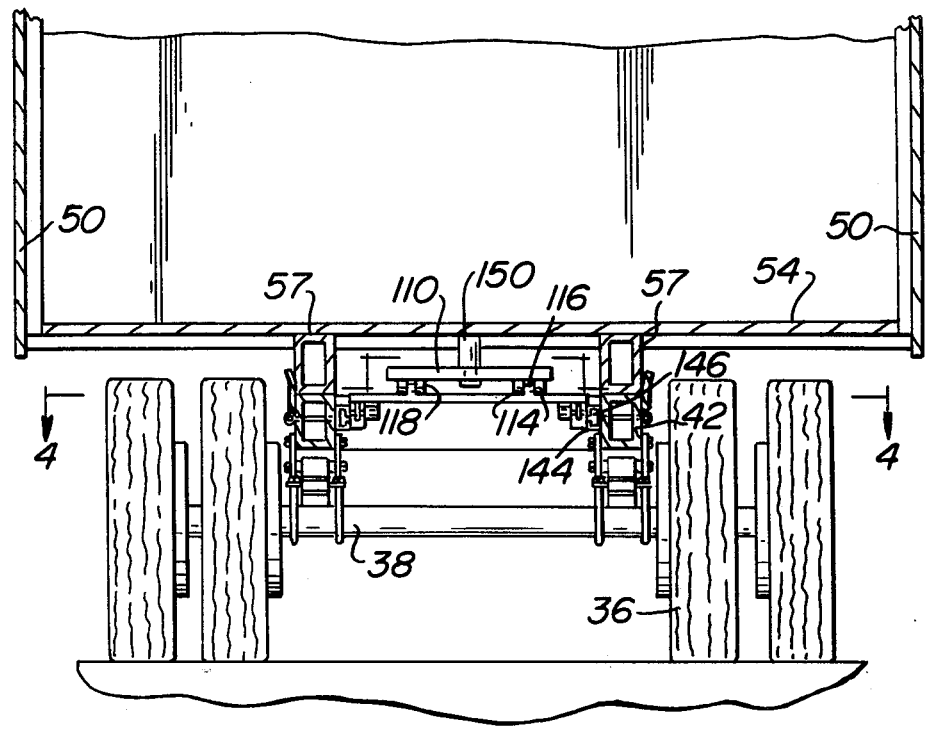
FIG. 3 is an enlarged sectional view taken along line 3—3 of FIG. 1.

Referring now to the drawing wherein like reference characters refer to like parts, there is shown generally at 20 a combination vehicle constructed in accordance with the instant invention. The vehicle basically comprises a tractor 22 on which is releasably mounted a body 24 and to which a trailer 26 is pivotably connected by coupling means 28. The tractor 22 comprises a short cab 30 mounted on a frame or chassis 32. The cab 30 is mounted over the front axle 34. A pair of small diameter, e.g., 15 inches (38.1 cm) wheels 36 are mounted on the axle 34. The rear of the frame 32 is supported by a pair of axles 38 and 40. Each rear axle also includes two pair of small diameter, e.g., 15 inch (38.1 cm) wheels 36 mounted thereon. The frame or chassis 32 basically comprises a pair of longitudinally extending rails 42. The rails are interconnected by cross bars 44. An elevatable "fifth-wheel" assembly 46 is mounted on the rails 42 forming the frame 32 above the forward most rear axle 38, as will be described in considerable detail later. The fifth wheel assembly serves as the means for releasably mounting the body 24 on the tractor chassis. Once the body 24 is mounted on the tractor it is fixed with respect thereto and does not pivot about the fifth wheel assembly 46. Thus, when the body 24 is mounted on the tractor, the combined configuration, to all intents and purposes, forms a truck, with the cab being disposed immediately adjacent the front wall 48 of the body 24. The close spacing between the tractor cab and the front wall of the body enables one to maximize cargo space while eliminating the effects of air resistance and drag produced by the conventional safety or buffer space normally found between the cab of a tractor and the front wall of the semi-trailer pivotably mounted on the fifth wheel of the tractor.

As shown in FIGS. 1 and 2, the body 24 is an enclosed housing having the previously mentioned front wall 48, a pair of sidewalls 50, a roof 52, a bed or floor 54 and a rear wall 56. A pair of beams 57 (FIG. 3) are mounted on the underside of the floor and serve as the support for the body when the body is mounted on the chassis of the tractor. The beams 57 of the body are disposed directed on top of the rails 42 of the chassis. Mounted on the rear wall is a door assembly 58. The door assembly 58 is constructed in accordance with the teachings of my co-pending U.S. patent application Ser. No. 258,148, filed on Apr. 27, 1981 now Pat. No. 4,379,585, entitled External Door For Vehicles, and whose disclosure is incorporated by reference herein.

That door assembly comprises a roll-up door which is located externally of the body 24 adjacent the opening (not shown) in the back wall and includes a sliding door in the form of plural pivotable panels and which is slidable from a stored position above the roof 52 to a pivoted open position (not shown) wherein the door covers the opening but is pivoted outward from the opening about a pivot axis located adjacent the bottom of the opening. The door is also pivotable to a pivoted closed position in which it is pivoted toward the opening to fully close the opening. The door is located within fixedly mounted track means when it is in the stored position. The track means are mounted externally of the body 24 adjacent the roof 52 and the sidewalls 50. The door is rolled into the pivotable track means when it is either in the pivoted open or pivoted closed position. The pivotable track means are pivotable about the pivot axis between the pivoted open and the pivoted closed position. In the pivoted open position, the moveable track means communicate with the fixed track means to enable the door to be moved from the former to the latter and vice versa.

The trailer 26 basically comprises a frame 60 on which is permanently secured and enclosed body 62. The body 62 comprises a front wall 64, a pair of sidewalls 66, a roof 68, a bed or floor 70 and a rear wall 72.

In accordance with the preferred embodiment of the instant invention, the front and rear wall of the body 62 each include an associated door assembly 58, constructed in an identical manner to the door assembly of the body 24.

It must be pointed out at this juncture that the "truck" body 24 or the "trailer" body 62 need not be a closed housing, like shown in the drawing, but can comprise a flat bed, with or without any sidewalls or cargo restraining barriers.

Figure 4:
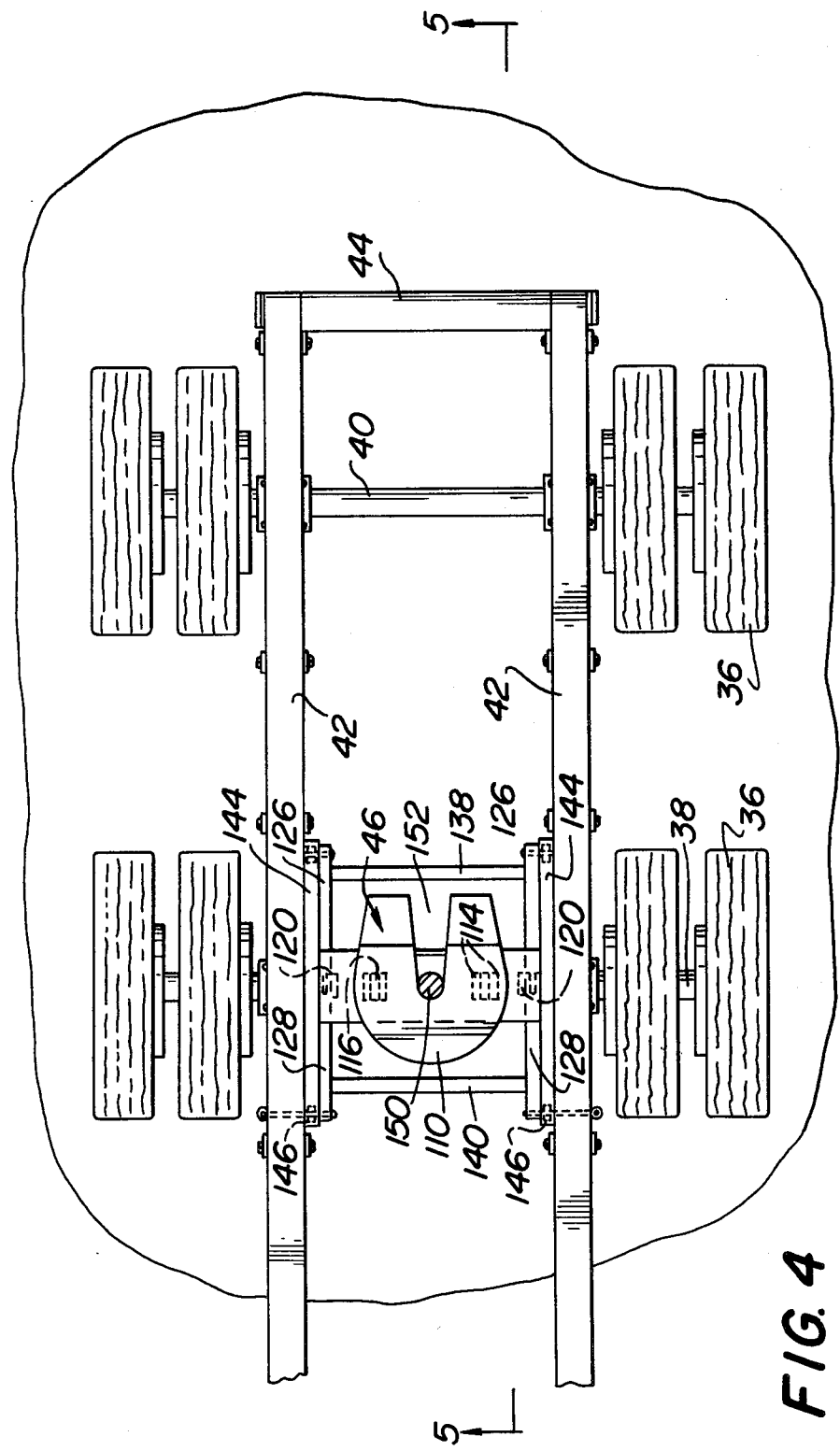
FIG. 4 is a sectional view taken along line 4—4 of FIG. 3.
Figure 5:
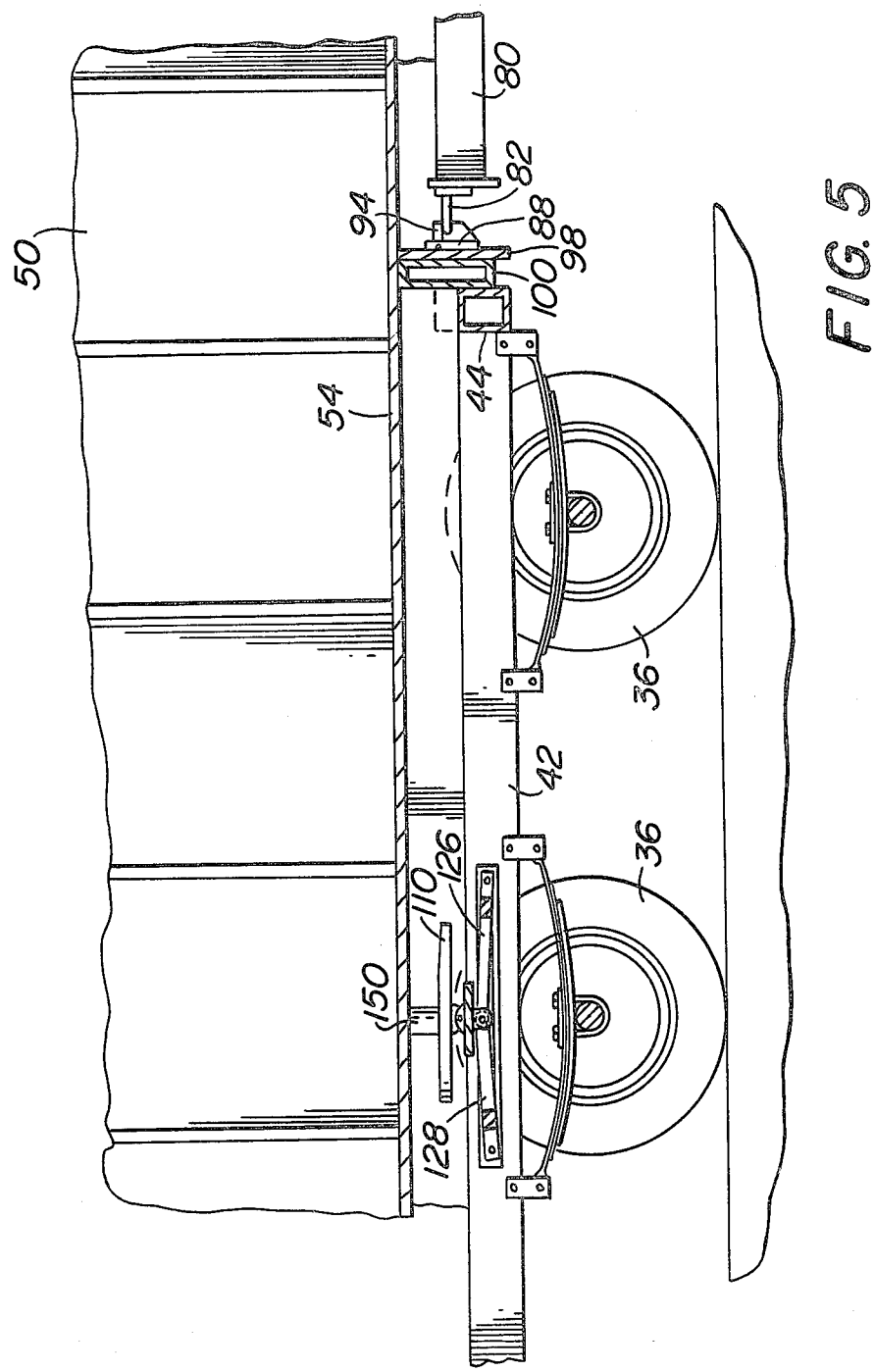
FIG. 5 is a sectional view taken along line 5—5 of FIG. 4.

As can be seen in FIGS. 2, 4 and 5, the frame 60 comprises a pair of parallel beams or rails 72 running the full length of the trailer body, that is, from the front wall 64 to the rear wall 72. A pair of axles 74 and 76 are mounted on the beams in approximately the middle of the trailer. Like the tractor, each axle of the trailer includes two pairs of small diameter wheels 36, e.g., 15 inches (38.1 cm).

As mentioned heretofore, the trailer 26 is coupled to the body 24 on the tractor 22 by articulated coupling means 28. The coupling means enables the front wall 64 of the trailer body to be closely spaced, e.g., 1 foot (30.1 cm), to the rear wall 56 of the truck body 24, so that cargo space for a given length of vehicle can be maximized and the air drag between the two bodies lessened, all without interfering with the ability of the combination 22 to safely negotiate corners and curves. To that end, as will be seen in detail hereinafter, the coupling means 28 enables the trailer 26 to pivot or swing with respect to the truck body 24 through a wide arc, e.g., an arc having a radius of 9 feet (2.74 m).

As will be appreciated by virtue of the fact that the front body 24 includes a roll-up door assembly 58 on its rear wall and with the trailer body including a respective roll-up door assembly on its front wall and rear wall, it is possible to load both of the bodies with cargo on a single, drive-through plan.

As noted heretofore in the preferred embodiment of the instant invention, the wheels for the combination 22 are of smaller diameter, e.g., 15 inches (38.1 cm). Preferably, the tires mounted on the wheels are 750×15, steel-belted radial tires. The small diameter wheels enable one to get the floor height in both bodies down to approximately 33 inches (0.85 m) from the conventional 54 inch (1.37 m) height of prior art trailers.

The net effect of the lowered floor height, close spacing between the two bodies and the close spacing between the tractor cab and the body mounted thereon enables one to increase cargo-handling capacity from approximately 3,000 cubic feet, with a 55-foot (16.76 m) rig including a 45-foot (13.72 m) trailer, to approximately 4,700 feet in the same overall length, with a 20-foot (6.1 m) body mounted on the tractor and a 30-foot (9.14 m) trailer spaced one foot (30.5 cm) therebehind.

The coupling means 28 basically comprises a tow bar 80 in the form of a V-shaped member fixedly secured to the frame rails 72 of the trailer and extending approximately 9 feet (2.74 m) beyond the front wall 64.

Figure 6:
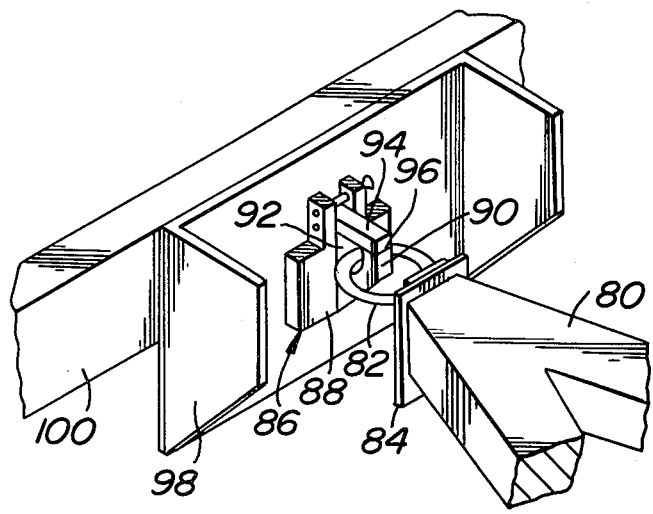
FIG. 6 is an enlarged perspective view of a portion of the coupling means connecting the vehicle bodies shown in FIG. 1.
Figure 8:
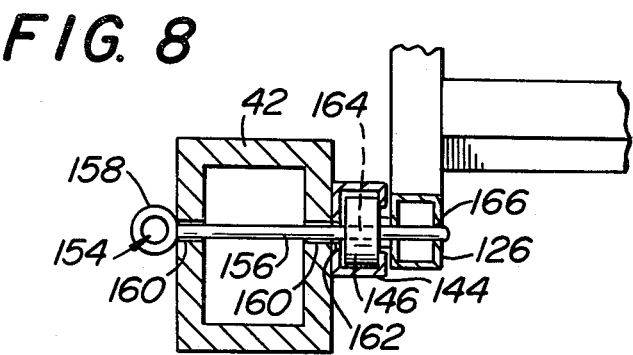
FIG. 8 is an enlarged sectional view taken along line 8—8 of FIG. 7.
Figure 9:
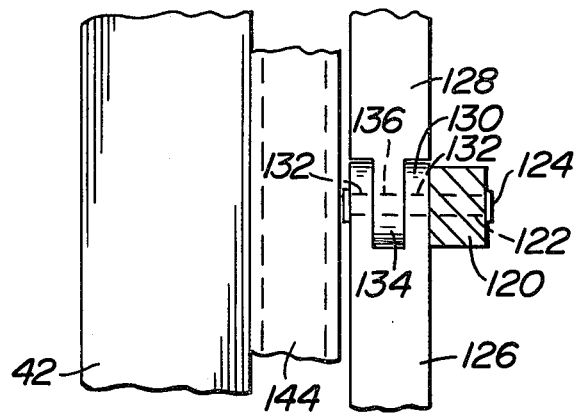
FIG. 9 is an enlarged sectional view taken along line 9—9 of FIG. 7.

As can be seen clearly in FIG. 6, the free end of the tow bar is in the form of a loop or ring 82 mounted on a vertical plate 84. The plane of the ring is horizontal. The ring is arranged to be engaged by a coupling means carried by the body 24 which includes a pintle hook assembly 86. The assembly 86 includes a mounting plate 88 from which hook jaw 90 projects upward. The jaw 90 is out of the plane of the base 88 and forms an opening 92 for receipt of the portion of the ring 82. A locking finger or latch 94 is pivotably secured to the plate 88 and is arranged to be brought into locking engagement on the top edge 96 of the jaw 90 to enclose the space 92. This action locks the ring within the opening 92, thereby securing the tow bar 80 to the plate 88. The plate 88 is in turn permanently secured onto a flanged plate 98. The flanged plate 98 is permanently secured to a cross bar 100 which extends across the underside of the floor of the body 24 and is permanently secured thereto (see FIG. 5). As shown most clearly in FIG. 1, the coupling means on the body 24 is mounted behind the rear wheels 36 and extends downwardly below the top of the wheels. The cross bar 100 is located a sufficient distance forward of the rear wall 56 of the body 24 so that the opening 92 for receipt of the locking ring is approximately 8 feet (2.44 m) forward of the rear wall 56. The ring 82 at the end of the tow bar 80 is disposed approximately 9 feet (2.74 m) beyond the front wall 64 of the trailer so that when the ring 82 is locked within the opening 92, thereby coupling the tow bar to the body 24, the body 26 is spaced from the body 24 by approximately 1 foot (30.5 cm), while enabling the trailer to pivot about the connection point through an arc, denoted by the reference numeral 102, in FIG. 2 having a radius 104 of approximately 9 feet (2.74 m). This arc is sufficiently long to enable the combination 20 to safely negotiate corners and curves.

In accordance with the preferred aspect of the instant invention, the tractor 22 is constructed so that in addition to accommodating the body 24 of the instant invention, it can be used with conventional semi-trailer bodies, with the body being pivotable at the fifth wheel connection. Since the fifth wheel of the tractor 22 of the instant invention is mounted on the frame at a height so that the body floor is only 33 inches from the ground, the fifth wheel includes elevating means to raise it to the standard height to accommodate a conventional trailer, that is, a trailer whose floor is approximately 54 inches above the ground.

The elevatable fifth wheel assembly 46 is shown in detail in FIGS. 3, 4, 5, 7, 8 and 9. As can be seen therein, the fifth wheel assembly 46 basically comprises a conventionally constructed fifth wheel element 110 pivotably mounted on an elevatable plate 112. To that end, the underside of the fifth wheel includes two pairs of projecting ears 114, each including an aligned opening therein. The plate 112 includes one pair of ears 116 projecting upward therefrom and spaced so that each ear 116 lies in the space between a respective pair of the ears 114. A pivot rod extends through aligned openings to pivotably connect the ears on the fifth wheel to the ears on the plate. The plate is a planar member of generally rectangular shape and including a pair of opposed side edges. A flanged ear 120 extends downward from the underside of the plate adjacent each side edge. Each ear 120 includes an opening 122 therein through which a pivot pin 124 extends. One pair of pivotable elevating arms 126 and 128 are pivotably connected to the ear by the pin 124. A second, identical pair of arms 126 and 128 are connected in a similar manner to the other ear 120. Each arm 126 includes a yoke-shaped end 130 (FIG. 9) having an aligned pair of openings 132 therein. Each arm 128 includes a narrowed end 134 and adapted to mate with the yoke at the end 130 of arm 126 and having an opening 136 therein. The pins 124 are located within aligned openings 132 and 136. The two arms 126 are fixedly secured together by a cross strut 138 while the two arms 128 are fixedly connected by a cross strut 140. The other end of each arm 126 is pivotably connected, via a respective stationary pivot pin 142 to a respective channel-shaped track 144. One track 144 is mounted longitudinally along the inside surface of one beam 42 forming the tractor frame while the other track is similarly mounted on the other beam. The other end of each arm 128 includes a roller 146 mounted thereon. Each roller is located within a respective track and is adapted to roll longitudinally therealong. As will thus be appreciated, when the two rollers 146 are rolled along the respective tracks toward the respective stationary pivot pins 142, the two arms 126 and 128 of each pair pivot toward each other, thereby elevating the fifth wheel 110. Conversely, when the rollers are rolled away from their respective pins 142, the arms pivot away from each other and the fifth wheel is lowered. When the rollers are located at the maximum distance from their respective pins, the arms are disposed at approximately a 180° angle to each other, with the plate 118 disposed immediately above the tracks so that the fifth wheel is in its lowest position. It is in this position that the body 24 is mounted on the tractor frame to form a truck-like configuration.

The mounting of the body 24 on the frame is accomplished by disposing its beams 57 on the chassis rails 42 and locating a king pin 150, which extends downward from the underside of the floor of the body 24, into the slot 152 in the fifth wheel. When the king pin is in place in the fifth wheel slot, the cross member 100, which is secured to the underside of the floor of the body 24, abuts the rearmost cross member 44 of the tractor frame (see FIG. 5) to insure that the body remains fixed with respect to the tractor frame.

Figure 7:
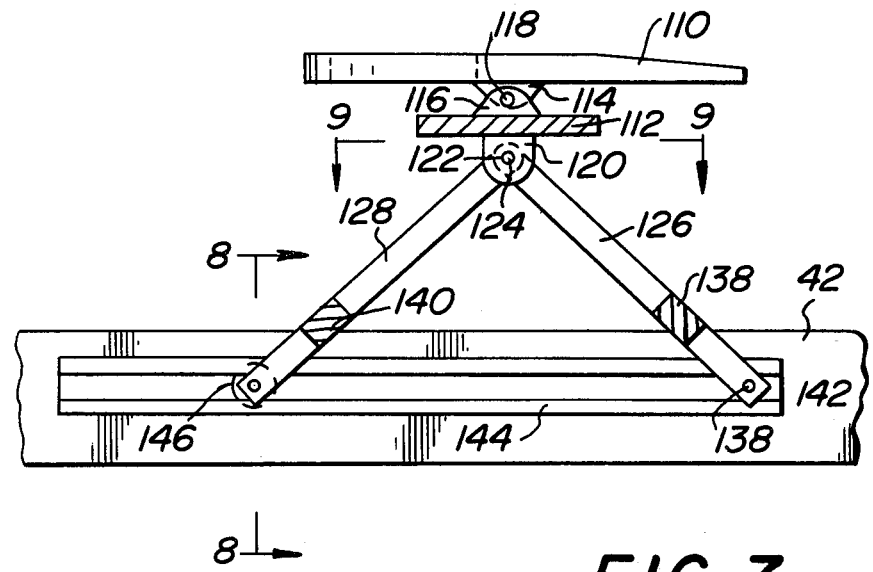
FIG. 7 is a side elevational view of a portion of an elevatable fifth-wheel of the tractor forming a portion of the vehicle shown in FIG. 1.

When it is desired to utilize the tractor 20 of the instant invention with a conventional semi-trailer body, all that is required is to remove the body 24 from the tractor and thereafter elevate the fifth wheel to the position shown in FIG. 7. When the fifth wheel is in the position shown in FIG. 7, the fifth wheel is elevated sufficient height above the ground so that a conventional trailer, having a 54 inch bed can be accommodated, with its king pin in the fifth wheel slot. In order to hold the fifth wheel in the elevated position, the fifth wheel assembly includes locking means to be described immediately hereafter with reference to FIG. 8. The locking means basically comprises a locking pin 154. The locking pin 154 is an elongated rod-like element 156 having a ring or loop shaped head 158. The rod-like portion 156 is arranged to extend through an aligned pair of openings 160 in the associated rail 42 of the tractor frame, through an aligned opening 162 in the associated track 144, through a central opening 164 in the associated roller 146 and into a pair of aligned openings 166 in the leg 128. The aligned openings 160 and 162 in the rail and track, respectively, are located at a predetermined longitudinal position along the track 144 so that when the pin 154 is disposed within the openings, the legs 126 and 128 are in the acute angled position shown in FIG. 7. The positioning of the pin as shown, precludes the rollers 146 from rolling along the tracks 144, thereby locking the fifth wheel 110 in the elevated position.

When it is desired to utilize the tractor 20 with a body 24 of the instant invention, all that is required is to remove the pins 154 from the openings 160 to free the rollers so that the rollers can be slid down the tracks away from pins 142 to lower the fifth wheel to its lowermost position.

Since the bodies 24 and 26 of the vehicle forming the instant invention are held in a position approximately 33 inches above the ground, means are provided to effect the elevation of the bodies to the conventional 54 inch height for storage of the bodies or for loading and unloading at conventional height loading docks and bays. To that end, each body includes jacking means 170 mounted at each corner of the body. The lifting means take different forms, depending upon the location on the body. In any event, the lifting means 170 are constructed in accordance with the teachings of my co-pending U.S. patent application Ser. No. 258,169, filed on Apr. 27, 1981 and entitled Jacking Mechanism For Vehicle Bodies, and whose disclosure is incorporated by reference herein. The jacking means 170 are arranged, when actuated, to raise the bed of the associated body to the height usable with conventional loading docks, e.g., 48 inches.

The operation of the vehicle 20 for use at conventional height loading docks is as follows: The vehicle 20 is moved to the proper location under the power of the tractor. The jacking means 170 is then set to lift the body 24 and the body 26 to the conventional loading dock height and the tractor is then driven away.

As should be appreciated from the foregoing, the combination vehicle 20 of the instant invention offers great flexibility in that it enables one to maximize cargo-carrying capacity within a given length vehicle without sacrificing maneuverability. Moreover, by virtue of the fact that the tractor includes an elevatable fifth wheel, the tractor can be used with conventional trailers.

It must be reiterated at this point that the teachings of the instant invention are not limited to enclosed trailer bodies, like that shown herein, but also relate to flat bed bodies, etc. Moreover, for conveying heavier cargos, additional axles can be provided on the tractor or on the trailer or on both.

It also must be pointed out that while the tow bar is shown permanently secured to the trailer with the pintle hook permanently secured to the truck body 8 feet (2.44 m) forward of the end thereof, such combination can be reversed, if desired. In this regard, the tow bar can be permanently secured to the truck body and extend 9 feet (2.74 m) behind the body for connection to a pintle hook permanently secured on the trailer body 8 feet to the rear thereof.

Without further elaboration, the foregoing will so fully illustrate my invention that others may, by applying current or future knowledge, readily adapt the same for use under various conditions of service.

What is claimed as the invention is:

1. An articulated vehicle for carrying cargo comprising a tractor having a cab and a frame including a pair of rear wheels fixedly mounted thereon; a first cargo-carrying bed releasably mounted on said frame; a trailer having a second cargo-carrying bed mounted on at least one pair of wheels and coupled to said first bed by an articulated connection comprised of first and second coupling means; said first bed having a forward end and a rear end, said first coupling means being fixedly mounted to the lower surface of said first bed forwardly of the rear end thereof a first predetermined distance from said rear end of said first bed, said first coupling means being mounted to said bed behind said rear wheels and extending downwardly below the top of said rear wheels; said second bed having a forward end and a rear end and having said second coupling means fixedly mounted thereon and extending a second predetermined distance forwardly of said forward end of said second bed for pivoting engagement with said first coupling means so that said first and second beds can pivot with respect to each other through an arc whose radius is equal to said second predetermined distance, said first predetermined distance being slightly less than said second predetermined distance so that said first and second beds are closely spaced to one another but do not impede the pivoting action of said beds through said arc so that said vehicle can negotiate corners and turns easily.

2. The vehicle of claim 1 wherein said second predetermined distance is approximately 9 feet (2.75 m) and wherein said first predetermined distance is approximately 8 feet (2.44 m), with the spacing between said first and second beds being approximately 1 foot (30.5 cm).

3. The vehicle of claim 2 wherein said first and second beds each include a floor approximately 33 inches (0.84 m) above the ground.

4. The vehicle of claim 3 wherein the wheels of said vehicle includes 750×15 tires mounted thereon.

5. The vehicle of claim 1 wherein said first bed comprises an enclosed body having a door and wherein said second bed comprises an enclosed body having a door.

6. The vehicle of claim 5 wherein the door on the first body is at the rear end thereof and wherein the door on the second body is at the rear end thereof.

7. The vehicle of claim 6 wherein said second body comprises a second door at the forward end thereof.

8. The vehicle of claim 1 wherein said second coupling means comprises a tow bar.

9. The vehicle of claim 8 wherein said tow bar and said first coupling means are pivotably connected by cooperating hook and loop means.

10. The vehicle of claim 9 wherein said second predetermined distance is approximately 9 feet (2.75 m) and wherein said first predetermined distance is approximately 8 feet (2.44 m), with the spacing between said first and second beds being approximately 1 foot (30.5 cm).

11. The vehicle of claim 10 wherein said first and second beds each include a floor disposed approximately 33 inches (0.84 m) above the ground.

12. The vehicle of claim 11 wherein the wheels of said vehicle includes 750×15 tires mounted thereon.

13. The vehicle of claim 1 wherein said first bed includes a floor and is releasably mounted on said frame, via a fifth wheel assembly, with the floor being disposed approximately 33 inches (0.84 m) above the ground.

14. The vehicle of claim 13 wherein said fifth wheel assembly is elevatable to accommodate trailers having a floor height of 48 inches (1.22 m).

15. The vehicle of claim 14 wherein said second predetermined distance is approximately 9 feet (2.75 m) and wherein said first predetermined distance is approximately 8 feet (2.44 m), with the spacing between said first and second beds being approximately 1 foot (30.5 cm).

* * * * *